United States Patent [19]
Kato

[11] Patent Number: 5,340,146
[45] Date of Patent: Aug. 23, 1994

[54] WHEEL INDEPENDENT SUSPENSION SYSTEM

[75] Inventor: Yoichiro Kato, Kanagawa, Japan

[73] Assignee: Nissan Motor Co., Ltd., Yokohama, Japan

[21] Appl. No.: 889,437

[22] Filed: May 28, 1992

[30] Foreign Application Priority Data

Jun. 3, 1991 [JP] Japan .................. 3-157419

[51] Int. Cl.⁵ .............................................. B60G 3/20
[52] U.S. Cl. ................................. 280/673; 280/688
[58] Field of Search ............... 280/663, 673, 679, 690, 280/698, 701

[56] References Cited

U.S. PATENT DOCUMENTS

| | | | |
|---|---|---|---|
| 4,616,846 | 10/1986 | Furuya et al. | 280/673 |
| 4,671,531 | 6/1987 | Sautter et al. | 280/690 |
| 4,671,532 | 6/1987 | Matschinsky et al. | 280/701 |
| 5,000,477 | 3/1991 | Minakawa et al. | 280/673 |
| 5,071,156 | 12/1991 | Kanai et al. | 280/690 |

FOREIGN PATENT DOCUMENTS

| | | |
|---|---|---|
| 0193089 | 2/1986 | European Pat. Off. . |
| 60-61318 | 4/1985 | Japan . |
| 0190507 | 7/1989 | Japan .................. 280/690 |
| 2243348 | 10/1991 | United Kingdom . |

*Primary Examiner*—Edwin L. Swinehart
*Attorney, Agent, or Firm*—Foley & Lardner

[57] ABSTRACT

An independent suspension system for a rear wheel of an automotive vehicle includes a wheel carrier for rotatably supporting a rear wheel. The wheel carrier is supported movably in the vertical and fore-and-aft directions with respect to the vehicle body, through a plurality of lateral links and a longitudinal link. The longitudinal link is connected at its front end to the vehicle body and at its rear end to the wheel carrier. The longitudinal link is integrally provided with an extended section which is extended from its rear end in the direction away from its front end to form a rear-most end. The extended section is axially aligned with the longitudinal link and connected at the rear-most end with one of the lateral links through an elastomeric bushing. The elastomeric bushing is constructed to establish a stiff connection in the vertical direction and a soft connection in the fore-and-aft and lateral directions with respect to the vehicle body, between the longitudinal links and one of the lateral link.

17 Claims, 8 Drawing Sheets

WHEEL INDEPENDENT SUSPENSION SYSTEM

BACKGROUND OF THE INVENTION

1. Field of the Invention

This invention relates to improvements in a wheel independent suspension system for a vehicle, more particularly to such a suspension system of the type wherein a wheel carrier is vertically movably supported to a vehicle body through a plurality of lateral links and a longitudinal link.

2. Description of the Prior Art

In wheel independent suspension systems of the above-mentioned type, it is usual that a lateral link makes a rigid connection between a vehicle body and a wheel carrier on which a wheel is rotatably supported. Accordingly, the pivot point of the suspension system during vertical stroke movements (bound and rebound) of the wheel resides at a vehicle body side connecting point of the longitudinal link.

When such a wheel independent suspension system is used for a rear wheel, the position of the pivot point affects so-called anti-squat characteristics for contributing to preventing the rear part of the vehicle body from lowering during vehicle acceleration and so-called anti-lift characteristics for contributing to preventing the rear part of the vehicle body from rising during vehicle braking. More specifically, the anti-squat characteristics can be improved by locating the pivot point of the suspension system above a horizontal plane passing through the rotational center or axis of the wheel since an acceleration force is applied to the wheel rotational center. The anti-lift characteristics are improved by locating the pivot point of the suspension system at a position where a line connecting the pivot point and the ground surface contacting point of the wheel forms a larger angle relative to the ground surface, since a braking force is applied to the wheel ground surface contacting point.

However, drawbacks have been encountered in the above conventional suspension system, as set forth below. In the conventional suspension system, on the basis that the pivot point of the suspension system resides at the vehicle body side connecting point of the longitudinal link, the pivot point is unavoidably strictly limited within a small region on account of vehicle structural and layout reasons and of noise and vibration suppressions requiring that the longitudinal link is connected to a high rigidity portion of the vehicle body. This fact is similar to all automotive vehicles. Under such a circumstance, it is impossible to freely select the pivot point of the suspension system for the purpose of improving the anti-squat characteristics and anti-lift characteristics of the vehicle.

In view of the above, it has been proposed, as shown in Japanese Patent Provisional Publication No. 60-61318, that the longitudinal link is connected with an upper lateral link of a plurality of lateral links through a rod which is connected at its one end with the longitudinal link at the intermediate portion and at the other end with the upper lateral link. The intermediate portion of the longitudinal link is located between the vehicle body side connecting point (end) and the wheel carrier side connecting point (end) of the longitudinal link. This arrangement is intended to cause the pivot point of the suspension system to shift from the vehicle body connecting point of the longitudinal link in a direction away from the wheel, i.e., forwardly with respect to the vehicle body. Thus, according to such a technique, the pivot point of the suspension system becomes located above the level of the rotational center of the wheel by virtue of the above-mentioned shift even if the vehicle body side connecting point of the longitudinal link resides below the level of the wheel rotational center, thereby improving the anti-squat characteristics of the vehicle during a vehicle acceleration.

However, shifting the pivot center of the suspension system forward relative to the vehicle body unavoidably leads to the fact that an angle formed by a line connecting the shifted pivot point and the ground surface contact point of the wheel relative to the ground surface is smaller than an angle formed by a line connecting the vehicle body side connecting point of the longitudinal link and the ground surface contact point of the wheel relative to the ground surface, thereby degrading the anti-lift characteristics of the vehicle. It is to be noted that the degraded amount of the anti-lift characteristics is considerably large as compared with the improved amount of the anti-squat characteristics. Taking account of the fact that the anti-squat characteristics can be relatively readily improved by suitably setting the specification of the suspension system, it will be understood that it is advisable to preferentially improve the anti-lift characteristics. In this regard, no vehicle rear part lowering or squat phenomena is generated during a vehicle acceleration, particularly in a front-wheel-drive vehicle. Hence, it is preferable to lay stress on improving the anti-lift characteristics of the vehicle in designing wheel independent suspension systems.

SUMMARY OF THE INVENTION

It is an object of the present invention to provide an improved wheel independent suspension system which can overcome the drawbacks encountered in conventional wheel independent suspension systems for vehicles.

Another object of the present invention is to provide an improved wheel independent suspension system which can effectively improve anti-lift characteristics of a vehicle without a considerable degradation of anti-squat characteristics of the vehicle.

A further object of the present invention is to provide an improved wheel independent suspension system by which the pivot point of the suspension system shifts rearward with respect to the vehicle body so that an angle formed by a line connecting the shifted pivot point and the ground surface contacting point of the wheel relative to the ground surface becomes larger than an angle formed by a line connecting the vehicle body side connecting point of the longitudinal link and the ground surface contacting point of the wheel relative to the ground surface.

A wheel independent suspension system according to the present invention is for a vehicle and includes a wheel carrier for rotatably supporting a wheel. The wheel carrier is movably connected with a vehicle body through first, second and third lateral links and a longitudinal link so as to allow the wheel carrier to make its vertical stroke movement with respect to the vehicle body. The lateral links extend generally transversely with respect to a longitudinal direction of the vehicle body. The longitudinal link extends generally along the longitudinal direction of the vehicle body. The longitudinal link has a first end connected to the vehicle body, and a second end connected to the wheel carrier. The longitudinal link is provided with an extended section extended from its second end in a direction away from its first end. The extended section is connected with one of the first, second and third lateral links.

Accordingly, the wheel carrier on which the wheel is rotatably carried is supported in the lateral and fore-and-aft directions of the vehicle by lateral links and the longitudinal link to make its vertical movement to allow the wheel to make its bound and rebound. The pivot point of the suspension system during the bound and rebound of the wheel can shift from the vehicle body side connecting point of the longitudinal link toward the side of the wheel carrier by virtue of connecting the extended section with one of the lateral links. Such a shift of the pivot point of the suspension system enlarges an angle of a line connecting the shifted pivot point and the ground surface contacting point of the wheel relative to the ground surface, thereby greatly improving the anti-lift characteristics as compared with the conventional arrangement in which the pivot point of a suspension system coincides with the vehicle body side connecting point of the longitudinal link.

There may be a tendency that such a shift of the pivot point of the suspension system degrades the anti-squat characteristics; however, the degraded amount of the anti-squat characteristics is considerably small as compared with the improved amount of the anti-lift characteristics and therefore is negligible. Additionally, the anti-squat characteristics can be readily improved by suitably setting the specification of the suspension system and therefore the degradation of the anti-squat characteristics is not problematic. Particularly in a front-wheel-drive vehicle in which no vehicle rear part lowering phenomena is generated during vehicle acceleration, the degraded anti-squat characteristics can be completely negligible.

BRIEF DESCRIPTION OF THE DRAWINGS

In the drawings, like reference numerals designate like elements and parts throughout all the figures, in which.

DETAILED DESCRIPTION OF THE INVENTION

Figure 1:
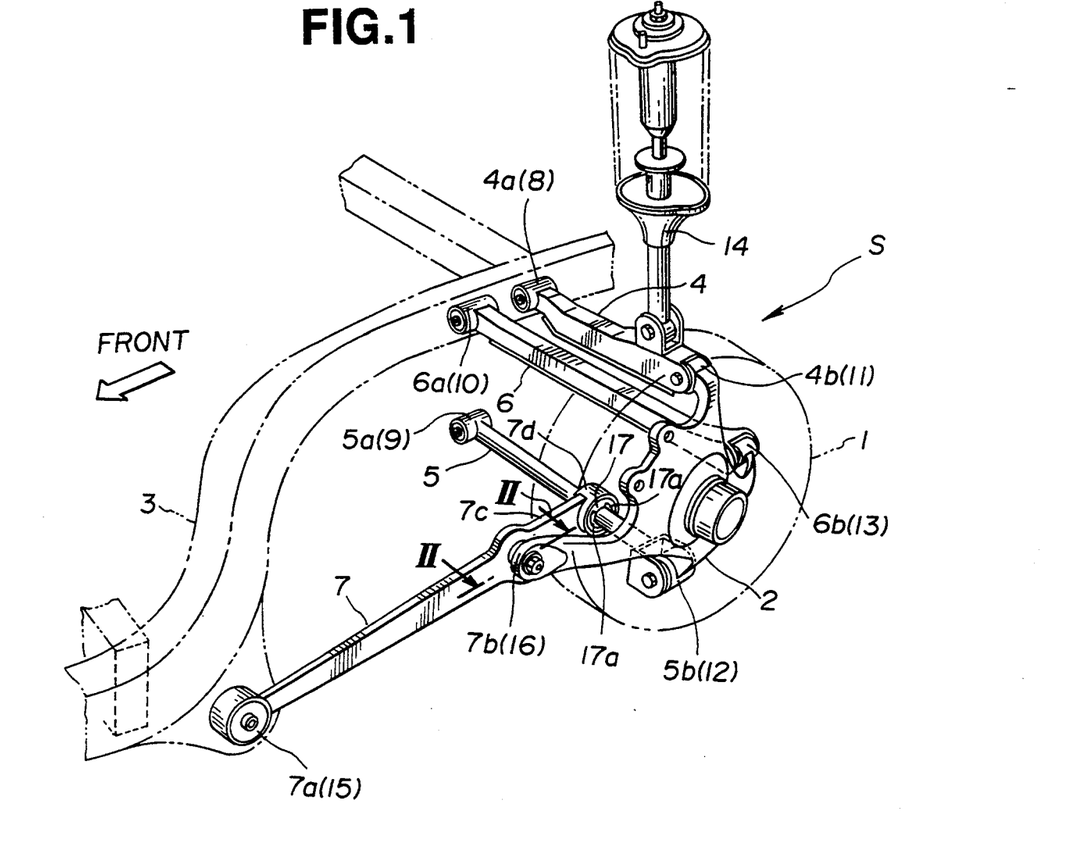
FIG. 1 is a perspective view of a first embodiment of a wheel independent suspension system in accordance with the present invention.

Referring now to FIG. 1 of the drawings, a first embodiment of a wheel independent suspension system S for a vehicle, according to the present invention, is illustrated by the reference character S. In this embodiment, the vehicle is an automotive vehicle and has a vehicle body 3 which is supported on a running gear (no numeral) including road wheels of which only a left rear wheel 1 is shown, through the wheel independent Suspension system S. The suspension system S of this embodiment is of the double wishbone type. The wheel 1 is rotatably supported on a wheel carrier 2 which is connected through three lateral links 4, 5, 6 and a longitudinal link 7 with the vehicle body 3. The lateral links 4, 5, 6 extend generally laterally with respect to the vehicle body 3. In other words, the lateral links 4, 5, 6 extend in a substantially transverse direction with respect to a longitudinal axis (not shown) or direction of the vehicle body 3. The longitudinal link 7 extends generally parallel with or along the longitudinal direction of the vehicle body 3. In other words, the longitudinal link 7 extends generally parallel with the longitudinal axis of the vehicle body 3. The lateral link 4 is located above the other lateral links 5, 6 and therefore referred to as an upper lateral link. The lateral link 5 is located in front of the lateral link 6, and therefore lateral link 5 is referred to as a front lower lateral link while the lateral link 6 is referred to as a rear lower lateral link. The lateral links 4, 5, 6 have respective inboard ends 4a, 5a, 6a which are pivotally connected to the vehicle body 3 through respective elastomeric or rubber bushings 8, 9, 10, so that the lateral links 4, 5, 6 are swingably supported to the vehicle body 3. The lateral links 4, 5, 6 have respective outboard ends 4b, 5b, 6b which are respectively pivotally connected to the wheel carrier 2 through respective elastomeric or rubber bushings 11, 12, 13, so that they 4, 5, 6 are swingably supported to the wheel carrier 2. Accordingly, the wheel carrier 2 and the wheel 1 are vertically movably supported by the vehicle body 3 and therefore can makes their vertical stroke movement.

A strut-shock absorber 14 is disposed between the upper lateral link 4 and the vehicle body 3. More specifically, the strut-shock absorber 14 has an upper end (no numeral) connected to the vehicle body 3 and a lower end (no numeral) connected to the upper lateral link 4. The wheel carrier 2 is elastically supported to the vehicle body 3 through the strut-shock absorber 14 and dampened in its vertical vibration under the action of the strut-shock absorber 14.

Figure 2:
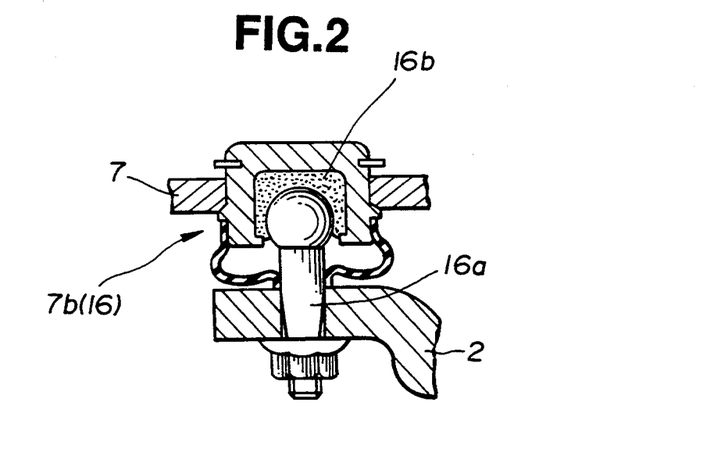
FIG. 2 is a fragmentary sectional view taken in the direction of arrows substantially along the line II—II of FIG. 1, showing a ball joint used in the suspension system of FIG. 1.

The longitudinal link 7 connects a part of the vehicle body 3 and the wheel carrier 2 to support the wheel carrier 2 in the fore-and-aft direction of the vehicle body 3. The longitudinal link 7 has a front end 7a pivotally connected to the vehicle body 3 through an elastomeric or rubber bushing 15, so that the longitudinal link 7 is swingably supported to the vehicle body 3. The longitudinal link 7 has a rear end (or wheel carrier side connecting point) 7b which is pivotally connected to the wheel carrier 2 through a ball joint 16 as shown in FIG. 2, so that the longitudinal link 7 is swingable in a variety of directions relative to the wheel carrier 2. The ball joint 16 includes a stud 16a provided with a ball section (no numeral). The stud 16a is fixedly supported by the wheel carrier 2. The ball section of the stud 16a is rotatably received in a seat 16b fixedly supported by the longitudinal link 7. The longitudinal link 7 is extended from the rear end 7b in a direction away from the front end 7a thereby to form an extended section 7c having a rear-most end 7d provided with an elastomeric or rubber bushing 17. The rear-most end 7d is connected through the elastomeric bushing 17 with the front lower lateral link 5. The extended section 7c is integral with the longitudinal link 7 and has an axis aligned with that of the longitudinal link 7. As shown in the Figures, the extended section 7c is shorter than the longitudinal link 7. More specifically, the rear-most end 7d of the longitudinal link 7 is formed generally cylindrical and disposed coaxial with the front lower lateral link 5. The elastomeric bushing 17 is generally annular and fitted between the cylindrical rear end 7d of the longitudinal link 7 and the front lower lateral link 5. The elastomeric bushing 17 is coaxial with the front lower lateral link 5. The elastomeric bushing 17 is formed with a pair of through-holes 17a, 17a which extend along the front lower link 5 in a manner to connect two opposite flat surfaces (no numerals) of the bushing 17, to which surfaces the axis of the front lower link 5 is perpendicular. The through-holes 17a, 17a are located opposite to each other with respect to a vertical plane (not shown) including the axis of the front lower link 5. Each through-hole 17a is generally arcuate in cross-section along a vertical plane (not shown) perpendicular to the axis of the front lower link 5. As a result, the connection between the front lower and longitudinal links 5, 7 is relatively soft in the fore-and-aft direction of the vehicle body 3 and relatively rigid in the vertical direction of the vehicle body 3. It is to be understood that an annular elastomeric bushing (such as the bushing 17) inherently has a low rigidity in the axial direction as compared with that in the radial directions, so that the connection between the front lower lateral and longitudinal links 5, 7 is relatively soft in the lateral direction of the vehicle body 3.

The manner of operation of the above described wheel independent suspension system S will be discussed hereinafter.

The wheel carrier 2 is restricted in movement in the transverse direction of the vehicle body 3 by the lateral links 4, 5, 6 and in movement in the fore-and-aft direction of the-vehicle body 3. Additionally, the wheel carrier 2 is vertically swingably movable to make its vertical stroke movement thereby allowing bound and rebound of the wheel 1. During such a vertical stroke movement of the wheel carrier 2, the strut-shock absorber 14 functions to absorb an impact applied to the wheel 1 while dampening a vibration of the wheel carrier 2, thus improving the riding comfort of the vehicle.

Figure 3:
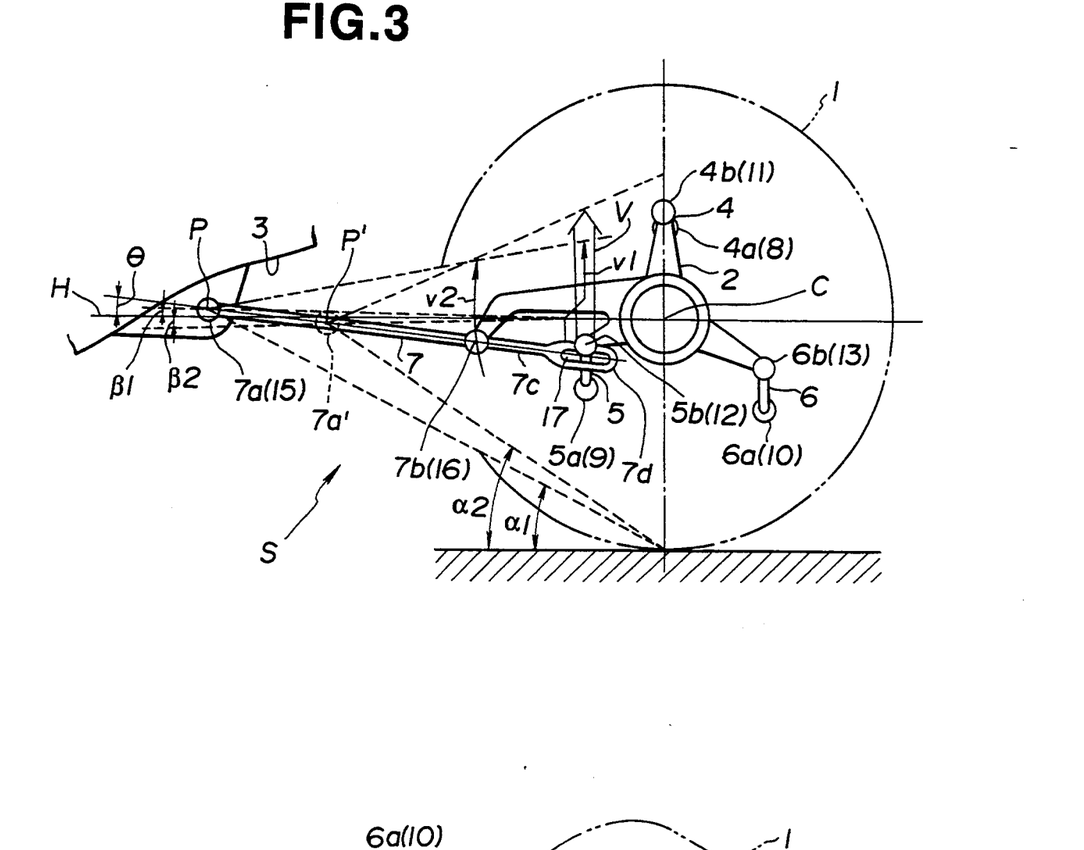
FIG. 3 is a schematic side view of the suspension system of FIG. 1, illustrating the operation of the suspension system.
Figure 4:
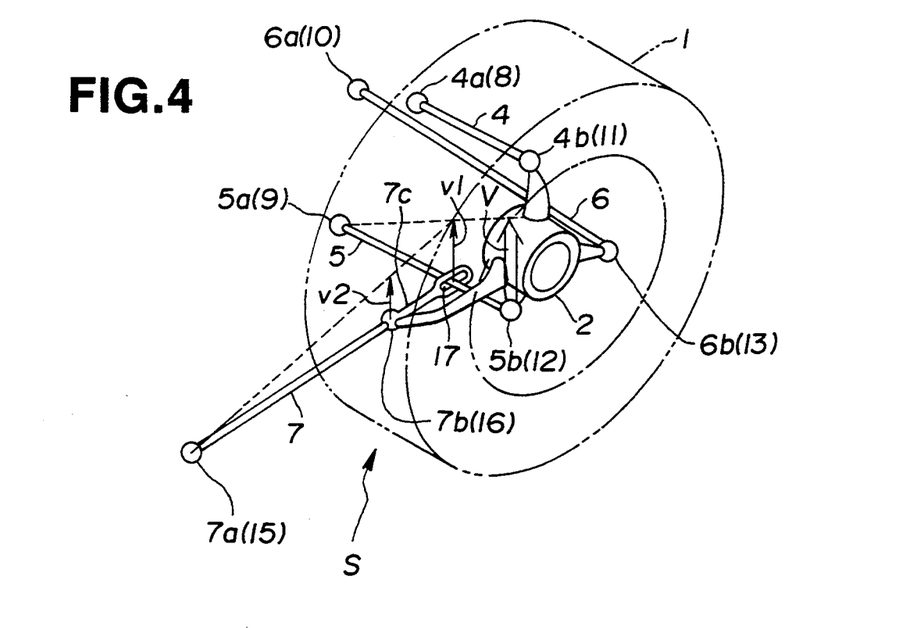
FIG. 4 is a schematic perspective view of the suspension system of FIG. 1, illustrating the operation of the suspension system.

Here, a study will be made on a pivot point P of the suspension system S with reference to FIGS. 3 and 4 in which the elastomeric bushing 17 is schematically illustrated to show the function thereof. The function of the elastomeric bushing 17 is such that the connection between the longitudinal link extended section 7c and the front lower lateral link 5 is relatively rigid or stiff in the vertical direction and relatively soft in the fore-and-aft and lateral directions with respect to the vehicle body 3. It will be understood that the pivot point P generally corresponds to the front end 7a of the longitudinal link 7. Assuming that a lateral link side connecting point (or the rear-most end 7d) of the longitudinal link 7 ascends at a velocity v1 while a wheel carrier side connecting point (or the rear end 7b) of the longitudinal link 7 ascends at a velocity v2 during the bound of the wheel 1, a wheel carrier side connecting point (or the outboard end 5b) of the front lower lateral link 5 ascends at a velocity V (V>v1) which is amplified by a lever ratio of the front lower lateral link 5. Accordingly, the pivot point P of the suspension system S is shifted by an amount corresponding to the difference between V and v1, rearwardly or toward the rear wheel side from the vehicle body side connecting point 7a thereby providing a momentary pivot point P' as indicated in FIG. 3. As a result, in FIG. 3, an angle $\alpha 2$ formed between the surface of the ground and a line connecting the pivot point P' and the contacting point of the wheel 1 to the ground is larger than an angle $\alpha 1$ formed between the ground surface and a line connecting the pivot point P and the wheel contacting point to the ground surface, thereby improving the anti-lift characteristics of the vehicle.

As will be understood, there may arise a tendency that the above-discussed rearward shift of the pivot point P to the point P' slightly degrades the anti-squat characteristics during an acceleration of the vehicle. This is because an angle $\beta 2$ formed between a line connecting the pivot point P' and the rotational center C of the wheel 1 and a horizontal plane H passing through the rotational center C resides below the horizontal plane H, while an angle $\beta 1$ formed between a line connecting the pivot point P and the wheel rotational center C and the horizontal plane H resides above the horizontal plane H, in addition to the fact that an inclination $\Theta$ of the longitudinal link 7 relative to horizontal plane H is such that the location of the link 7 becomes lower in a direction toward the rear of the vehicle. However, the degraded amount of the anti-squat characteristics is considerably small as compared with the improved amount $(\alpha 1 - \alpha 2)$ of the anti-lift characteristics and therefore negligible. Additionally, the anti-squat characteristics can be easily improved by other various measures, i.e., by suitably setting the specification of the suspension system S, so that the degraded anti-squat characteristics are not so problematic. Particularly in a front-wheel-drive automotive vehicle, no squat or vehicle rear part lowering phenomena is produced during an acceleration of the vehicle, and accordingly the slight degradation of the anti-squat characteristics can be completely negligible.

Furthermore, by virtue of the inherent characteristics and of the through-holes 17a, 17a of the elastomeric bushing 17, the connection of the longitudinal link 7 with the front lower link 5 is relatively soft in the lateral direction and in the fore-and-aft direction of the vehicle body, so that no prize is generated thereby allowing the bound and rebound of the wheel 1 to smoothly take place.

Figure 5:
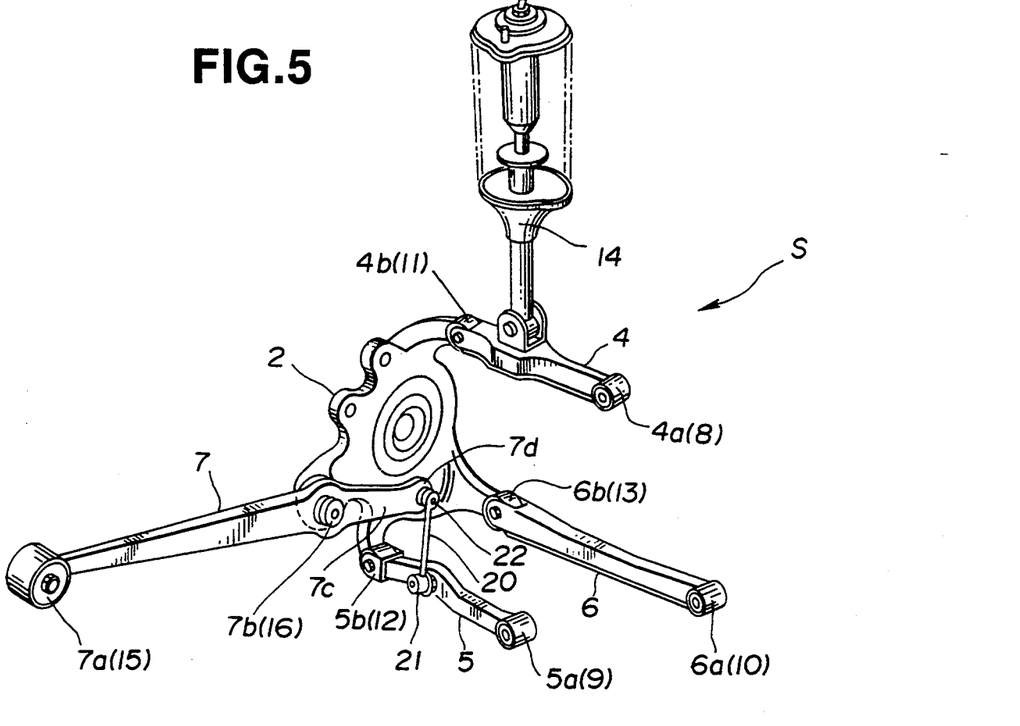
FIG. 5 is a perspective view of a second embodiment of the wheel independent suspension system in accordance with the present invention.

FIG. 5 illustrates a second embodiment of the wheel independent suspension system S which is similar to the embodiment of FIGS. 1 and 2 but for a right rear wheel (not shown) of the vehicle. In this embodiment, the rear-most end 7d forming part of the longitudinal link extended section 7c is connected with the front lower link 5 through a connecting rod 20. The connecting rod 20 has an upper end connected with the longitudinal link rear-most end 7d through a ball joint 22. The lower end of the connecting rod 20 is connected with the front lower link 5 through a ball joint 21. Each ball joint 21, 22 has the same structure as the ball joint 16, so that the connection of the longitudinal link 7 with the front lower link 5 is relatively rigid in the vertical direction of the vehicle body and relatively soft in the lateral and fore-and-aft directions of the vehicle body. Additionally, using this connecting rod 20 is further advantageous because of increasing the degree of freedom of selecting a locational relationship between the two links 5, 7.

It will be appreciated that the same advantageous effects as those in the first embodiment can be obtained even by connecting the longitudinal link extended section 7c having the rear-most end 7d, with other lateral links 4, 6 under the principle discussed before with reference to FIGS. 3 and 4. However, it is preferable to connect the rear-most end 7d of the longitudinal link extended section 7c with the front lower lateral link 5 for the purpose of simplifying the construction of the suspension system S.

Figure 6:
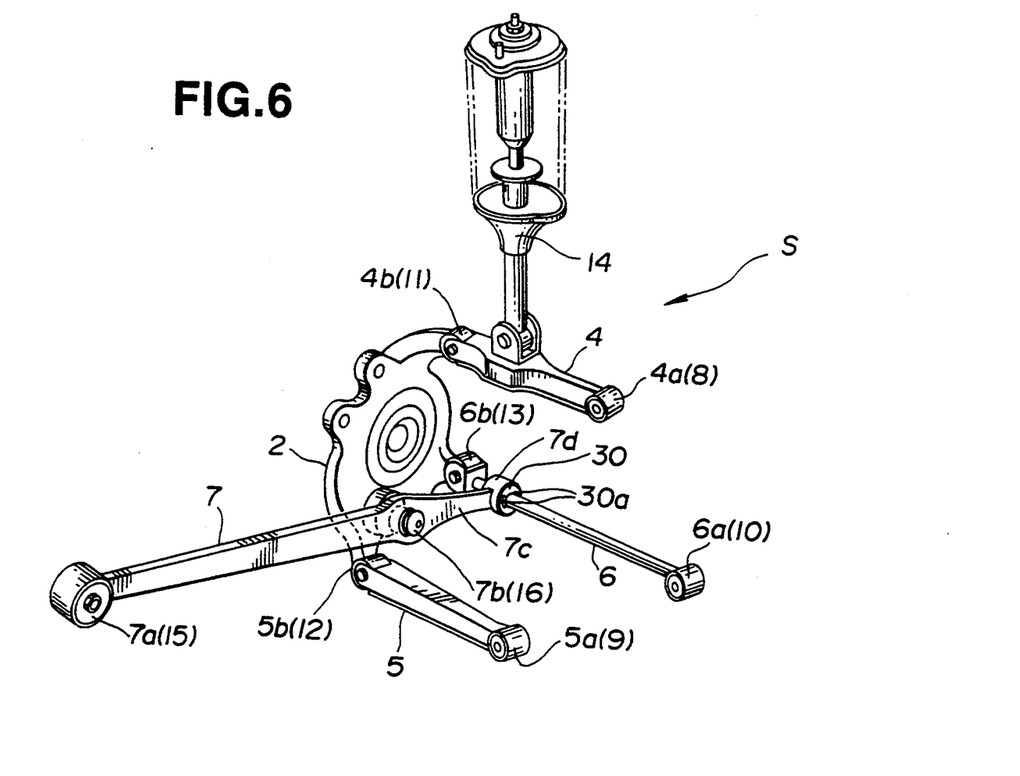
FIG. 6 is a perspective view of a third embodiment of the wheel independent suspension system in accordance with the present invention.

FIG. 6 illustrates a third embodiment of the wheel independent suspension system according to the present invention, which is similar to the second embodiment of FIG. 5 with the exception that the rear-most end 7d of the extended section 7c of the longitudinal link 7 is connected to the rear lower lateral link 6 through an elastomeric or rubber bushing 30. The elastomeric bushing 30 is disposed coaxial with the rear lower lateral link 6 and formed with a pair of through-holes 30a, 30a which are the same as those 17a, 17a in the first embodiment shown in FIG. 1. Accordingly, the through-holes 30a, 30a are located opposite to each other with respect to a vertical plane passing through the axis of the lower lateral link 6, so that the connection of the longitudinal link extended section 7c with the rear lower lateral link 6 is relatively soft in the fore-and-aft and lateral directions of the vehicle and relatively rigid in the vertical direction of the vehicle.

Also with this arrangement, the longitudinal link 7 is connected to the lateral link 6 at a position rearward of the wheel carrier connecting point 7b of the longitudinal link 7, and therefore the pivot point P of the suspension system S can be shifted rearward of the vehicle body side connecting point 7a of the longitudinal link 7 during bound and rebound of the wheel 1 under the same principle as that discussed with reference to FIGS. 3 and 4, thereby enabling the anti-lift characteristics to be improved. Additionally, by virtue of the above-discussed elastomeric bushing 30 through which the connection between the longitudinal link extended section 7a and the lateral link 6 is made, no prize is produced during the bound and rebound of the wheel 1 thereby smoothening the stroke movement of the suspension system S, the same as in the afore-discussed embodiment.

Figure 7:
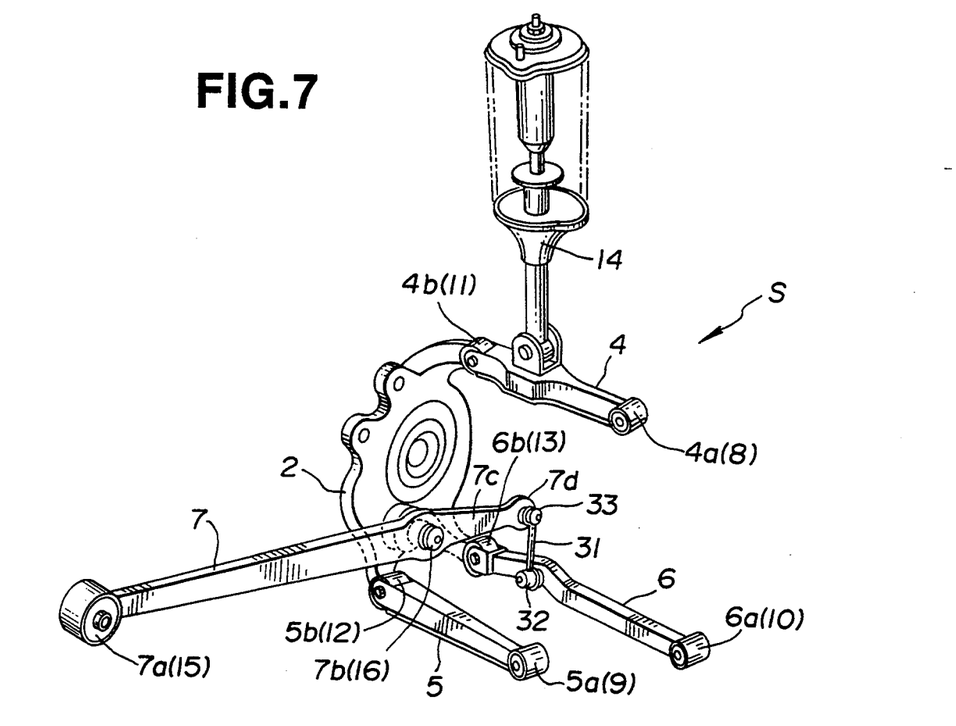
FIG. 7 is a perspective view of a fourth embodiment of the wheel independent suspension system in accordance with the present invention.

FIG. 7 illustrates a fourth embodiment of the wheel independent suspension system according to the present invention, similar to the third embodiment of FIG. 6 except for the connection between the longitudinal link extended section 7c and the rear lower lateral link 6 is made through a connecting rod 31 in place of the elastomeric bushing 30. The connecting rod 31 is the same as the rod 20 in the second embodiment of FIG. 5, so that the connection of the longitudinal extended section 7c with the lateral link 6 is relatively rigid in the vertical direction of the vehicle body 3 and relatively soft in the fore-and-aft and lateral directions of the vehicle body 3. It will be understood that the connections of the upper and lower ends (no numerals) of the connecting rod 31 with the corresponding links are made through ball joints 32, 33 which are the same as the ball joints 21, 22 of the second embodiment as shown in FIG. 5.

Figure 8:
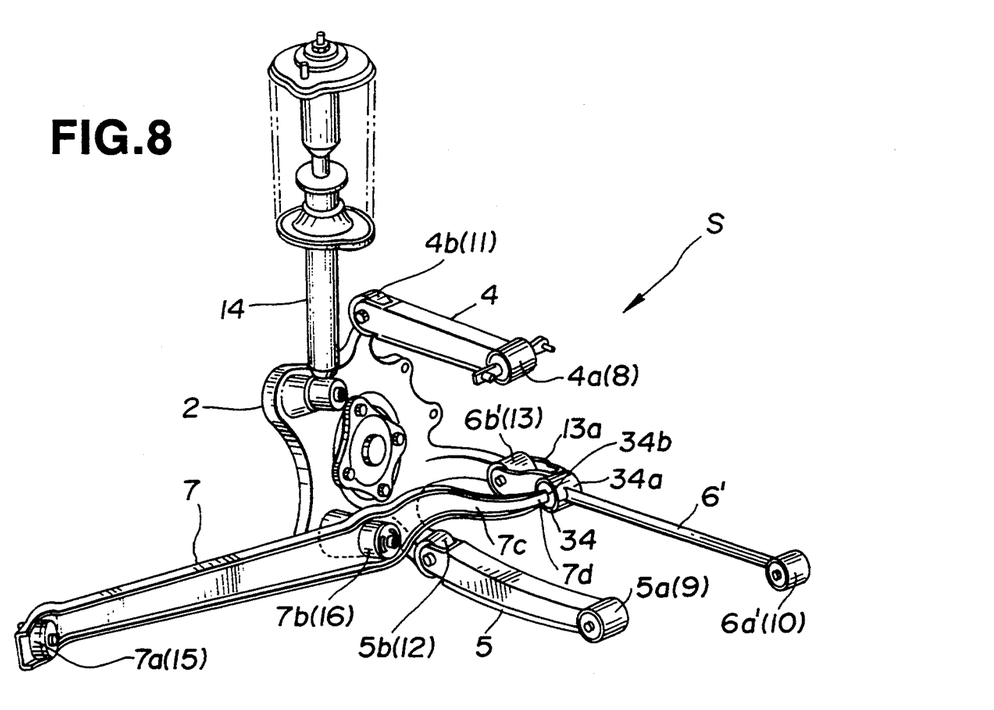
FIG. 8 is a perspective view of a fifth embodiment of the wheel independent suspension system in accordance with the present invention.

FIG. 8 illustrates a fifth embodiment of the wheel independent suspension system S of the present invention, which is similar to the third embodiment of FIG. 6. In this embodiment, a side rod or tie rod 6' through which the wheel carrier 2 is turned is shown to make its stroke movement in the lateral direction of the vehicle body, i.e., in the transverse direction with respect to the longitudinal axis of the vehicle body. The rod 6' serves also as the rear lower lateral link as shown in the third embodiment of FIG. 6. The connection of the longitudinal link extended section 7c with the rear lower lateral link or the rod 6' is made relatively soft only in the fore-and-aft direction of the vehicle body, so that this connection is made through an elastomeric or rubber bushing 34 which is similar to the bushing 17 of the first embodiment of FIG. 1 with the exception that no through-hole 17a is formed. The elastomeric bushing 34 is disposed in such a manner that the axis thereof extends in the extension direction of the longitudinal link extended section 7c. More specifically, the elastomeric bushing 34 is fitted between outer and inner cylinders 34a, 34b which are coaxially arranged. The outer cylinder 34a is fixedly provided with an installation bracket 13a which is connected to the wheel carrier 2 at the wheel carrier connecting point 6b' which is far from the vehicle body side connecting point 6a'. The rear-most end 7d of the longitudinal link extended section 7c is fixedly inserted into the inner cylinder 34b of the elastomeric busing 34. Preferably, the rear-most end 7d of the longitudinal link is separated from the connecting point 7b by a distance more than ⅓ of the longitudinal dimension of the wheel carrier 2, and, most preferably, by a distance more than ½ of the longitudinal dimension of the wheel carrier.

Figure 9:
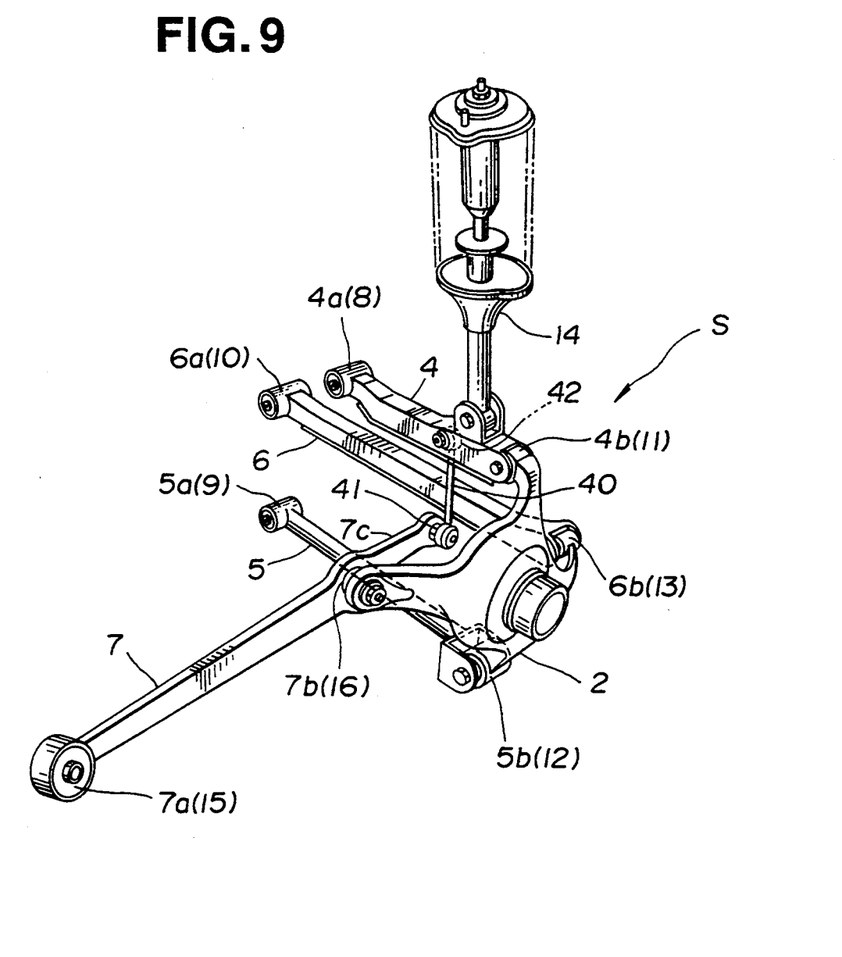
FIG. 9 is a perspective view of a sixth embodiment of the wheel independent suspension system in accordance with the present invention.

FIG. 9 illustrates a sixth embodiment of the wheel independent suspension system of the present invention, which is similar to the first embodiment of FIG. 1 with the exception that the longitudinal link extended section 7c is connected with the upper lateral link 4 through a connecting rod 40. The connecting rod 40 is the same as the rod 20 of the second embodiment of FIG. 2. Also in this embodiment, the upper and lower ends of the connecting rod 40 are connected to the upper lateral link 4 and the longitudinal link extended section 7c through ball joints 41, 42, respectively, which are the same as the ball joints 21, 22 of the second embodiment of FIG. 5.

As a result, the connection of the longitudinal link extended section 7c with the lateral link 4 is made relatively rigid in the vertical direction of the vehicle body and relatively soft in the fore-and-aft and lateral directions of the vehicle body.

Thus, also in the case that the longitudinal link extended section 7c is connected with the upper lateral link 4, the longitudinal link 7 is connected to the lateral link 4 at a position rearward of the wheel carrier side connecting point 7b of the longitudinal link 7. Accordingly, the pivot point (P) of the suspension system S can be shifted to a position (P') rearward of the vehicle body side connecting point 7a during bound and rebound of the wheel under the same principle as that illustrated with reference to FIGS. 3 and 4, thus enabling the anti-lift characteristics of the suspension system S to be improved. Additionally, by virtue of using the connecting rod 40 for the connection between the longitudinal extended section 7c and the lateral link 4, no prize is produced at the connecting portion therebetween during the bound and rebound of the suspension system S, thereby allowing a smooth suspension stroke movement to be made.

In the above-discussed embodiments, the connection between the longitudinal link extended section 7c and one of the lateral links 4, 5, 6 is made relatively rigid in the vertical direction of the vehicle body and relatively soft in the fore-and-aft and lateral directions of the vehicle body, at a connecting point or portion therebetween. However, the connection between them may be established by connecting the carrier side connecting point (or rear end) 7b of the longitudinal link 7 with the wheel carrier 2 through a particular elastomeric bushing or a connecting rod in order to obtain a smooth suspension stroke movement. Examples of such a connection are shown in FIGS. 10, 11, 12 and 13 which are respectively referred to as the seventh, eighth, ninth and tenth embodiments of the present invention.

Figure 10:
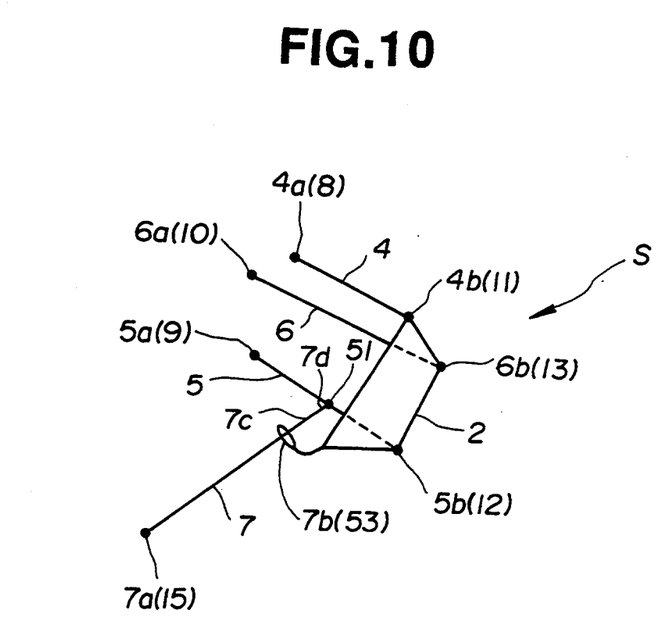
FIG. 10 is a schematic illustration of a seventh embodiment of the wheel independent suspension system in accordance with the present invention.

In the seventh embodiment of FIG. 10, the extended section 7c of the longitudinal link 7 is connected at its rear-most end 7d with the front lower lateral link 5 through a ball joint 51 which is the same as the ball joint 16 of the first embodiment as shown in FIG. 1. Additionally, the longitudinal link 7 is connected at its wheel carrier side connecting point 7b with the wheel carrier 2 through an elastomeric or rubber bushing 53 which is the same as the bushing 17 of the first embodiment as shown in FIG. 1, in such a manner that the connection of the longitudinal link 7 with the wheel carrier 2 is made relatively rigid in the vertical direction of the vehicle body and relatively soft in the fore-and-aft and lateral directions of the vehicle body.

In the eighth embodiment of FIG. 8, the extended section 7c of the longitudinal link 7 is connected at its rear-most end 7d with the front lower lateral link 5 through a ball joint 51 which is the same as the ball joint 16 of the first embodiment as shown in FIG. 1. Additionally, the longitudinal link 7 is connected at its wheel carrier side connecting point 7b with the wheel carrier 2 through a connecting rod 54 which is the same as the rod 20 of the second embodiment as shown in FIG. 2, in such a manner that the connection of the longitudinal link 7 with the wheel carrier 2 is made relatively rigid in the vertical direction of the vehicle body and relatively soft in the fore-and-aft and lateral directions of the vehicle body.

Figure 12:
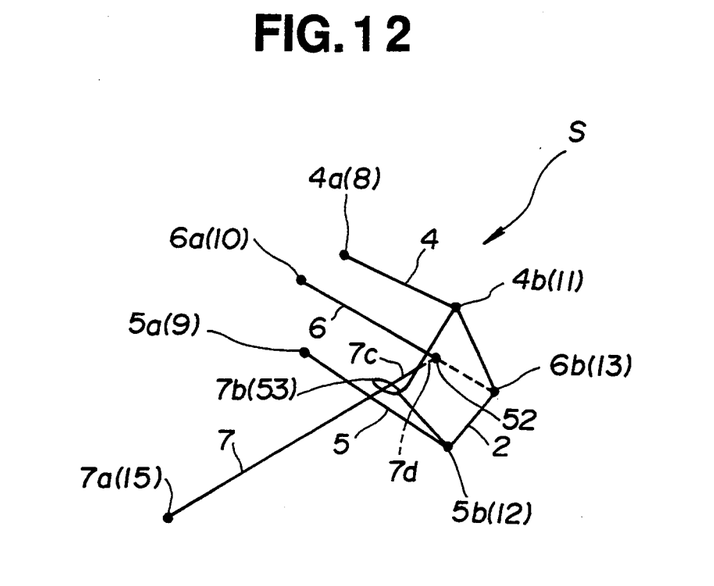
FIG. 12 is a schematic illustration of a ninth embodiment of the wheel independent suspension system in accordance with the present invention.

In the ninth embodiment of FIG. 12, the arrangement of this embodiment is similar to that of the seventh embodiment of FIG. 7 with the exception that the rear-most end 7d of the longitudinal link extended section 7c is connected with the rear lower lateral link 6 through a ball joint 52 which is the same as the ball joint 51 of the seventh embodiment.

Figure 11:
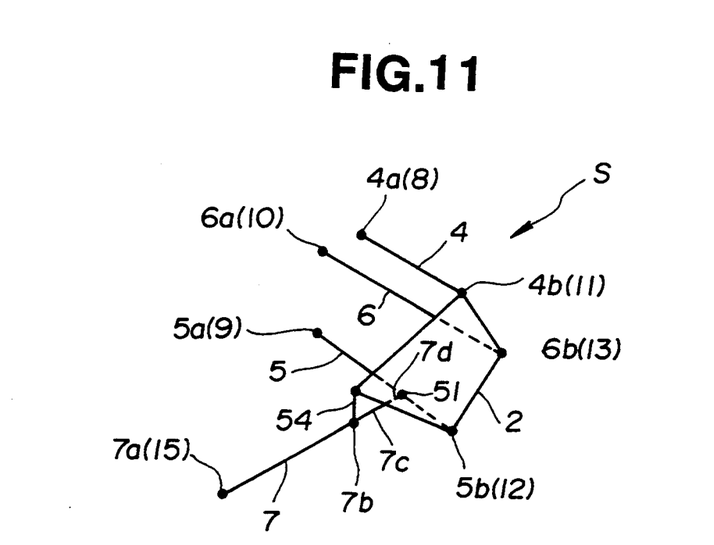
FIG. 11 is a schematic illustration of an eighth embodiment of the wheel independent suspension system in accordance with the present invention.
Figure 13:
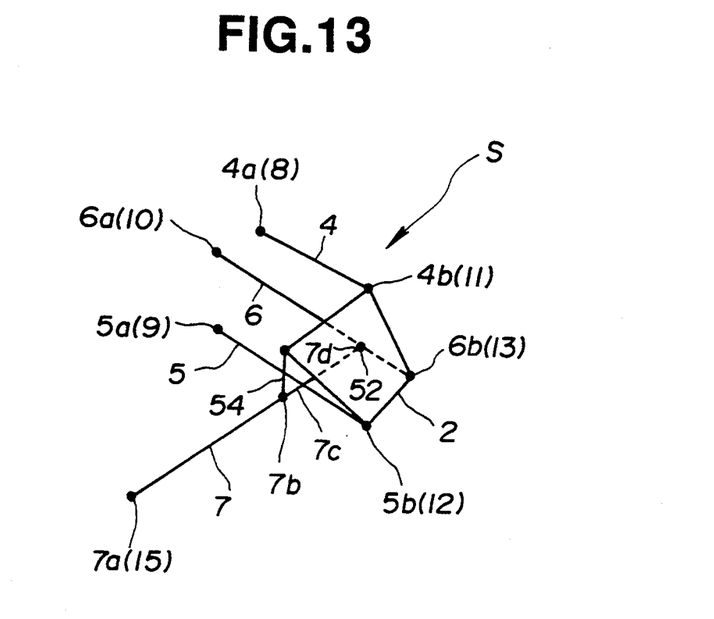
FIG. 13 is a schematic illustration of a tenth embodiment of the wheel independent suspension system in accordance with the present invention.

In the tenth embodiment of FIG. 13, the arrangement of this embodiment is similar to that of the eighth embodiment of FIG. 11 with the exception that the rear-most end 7d of the longitudinal link extended section 7c is connected with the rear lower lateral link 6 through the ball joint 52.

Figure 14:
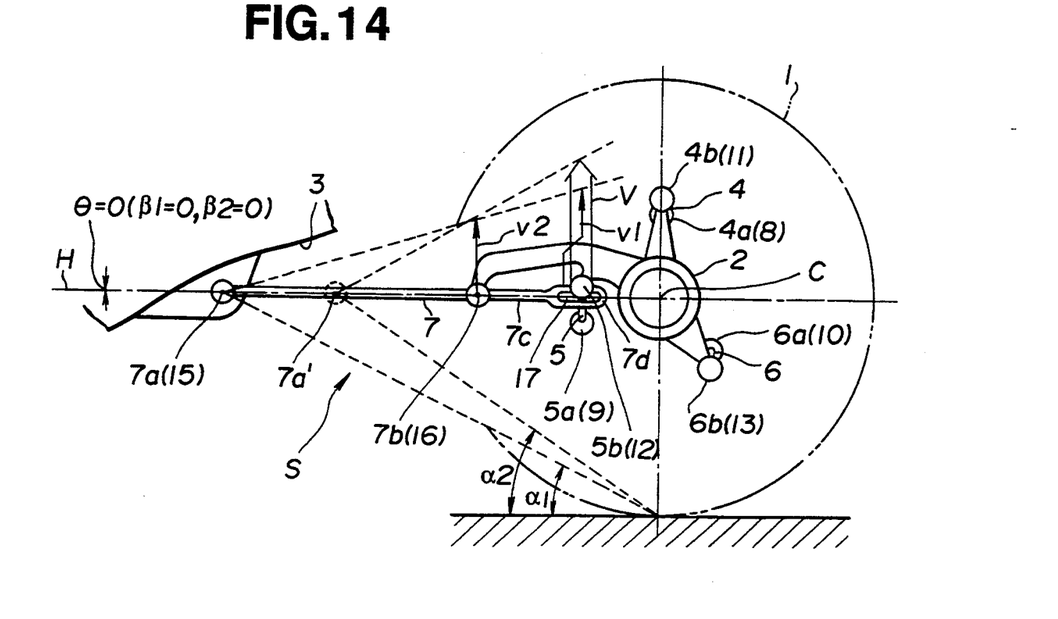
FIG. 14 is a schematic side view of an eleventh embodiment of the wheel independent suspension system in accordance with the present invention, showing the operation of the suspension system.

FIG. 14 illustrates an eleventh embodiment of the wheel independent suspension system S of the present invention, which is similar to the first embodiment of FIGS. 1 to 4 except for an arrangement in which the longitudinal link 7 is disposed along the horizontal plane H passing through the rotational center C of the wheel 1 in a stationary state of the suspension system S. Accordingly, the inclination angle of the axis of the longitudinal link 7 is zero in the stationary state of the suspension system S. Also in this embodiment, the shift of the pivot point P toward the point P' is made along the longitudinal direction of the longitudinal link 7 under the same principle as that of the first embodiment as illustrated with reference to FIGS. 3 and 4. Thus, the angles $\beta 1$, $\beta 2$ relating to the anti-squat characteristics are both zero, and therefore $\beta 1$ equals $\beta 2$. As a result, the anti-lift characteristics are improved by achieving the relationship of $\alpha 2 > \alpha 1$ with no degradation of the anti-squat characteristics of the vehicle.

Figure 15:
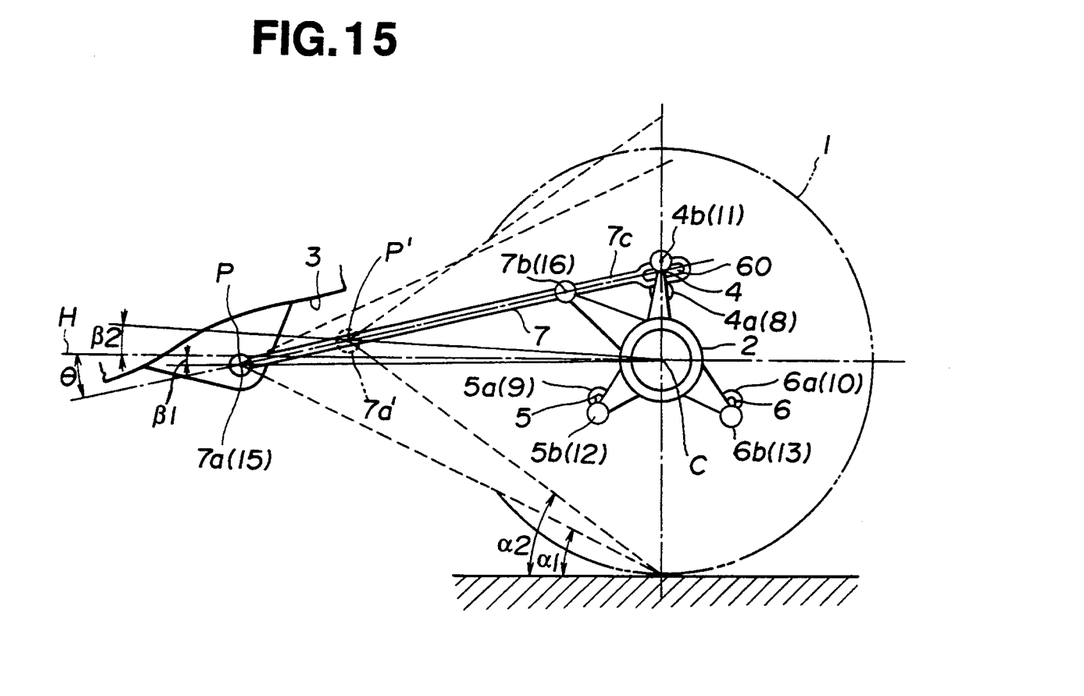
FIG. 15 is a schematic side view of a twelfth embodiment of the wheel independent suspension system in accordance with the present invention.

FIG. 15 illustrates a twelfth embodiment of the wheel independent suspension system S of the present invention, which is similar to the sixth embodiment of FIG. 9 except for the arrangement in which the rear-most end 7d of the longitudinal link extended section 7c is directly connected with the upper lateral link 4 through an elastomeric or rubber bushing 60 which is the same as the bushing 17 of the first embodiment as shown in FIG. 1. By virtue of the elastomeric bushing 60, the connection of the longitudinal link extended section 7c with the upper lateral link 4 is made relatively rigid in the vertical direction of the vehicle body and relatively soft in the fore-and-aft and lateral directions of the vehicle body. In this embodiment, the longitudinal link 7 is connected with the upper lateral link 4 at a position above the pivot point P of the suspension system S, and arranged so as to be raised toward the rear of the vehicle body 3 to form the inclination $\Theta$ relative to the vertical plane H passing through the wheel rotational center C. As a result, the pivot center P of the suspension system S shifts toward the point P' so that it resides above the horizontal plane H. As is apparent from the above and from the relationship between $\beta 1$ and $\beta 2$ relating to the anti-squat characteristics of the vehicle, according to this embodiment, the anti-lift characteristics can be improved by establishing the relationship of $\alpha 2 > \alpha 1$, while achieving improvements in the anti-squat characteristics of the vehicle.

What is claimed is:

1. A wheel independent suspension system for a vehicle, comprising:
   a wheel carrier for rotatably supporting a wheel;
   first, second and third lateral links through which said wheel carrier is movably connected with a vehicle body, said lateral links extending generally transversely with respect to a longitudinal direction of the vehicle body;

a longitudinal link through which said wheel carrier is movably connected to the vehicle body, said longitudinal link extending generally along the longitudinal direction of the vehicle body, said longitudinal link having a first section defined by a first end connected to the vehicle body and an intermediate point directly connected to a portion of said wheel carrier;

means for allowing the wheel carrier to make its vertical stroke movement with respect to the vehicle body, in cooperation with said lateral and longitudinal links; and a second section of the longitudinal link, defined by the intermediate point and a second end, the second section being integral with and extended from said longitudinal link intermediate point in a direction away from said first end of said longitudinal link, the second section being connected with one of said first, second and third lateral links, the second end being separated a distance from the intermediate point of said longitudinal link in the vehicle body longitudinal direction, said portion of said wheel carrier being located between said first end of said longitudinal link and said second end in the vehicle longitudinal direction, said second section being shorter in length than said first section.

2. A wheel independent suspension system as claimed in claim 1, wherein said first lateral link is located above said second and third lateral links with respect to the vehicle body, and wherein said second link is located forward of said third lateral link with respect to the vehicle body.

3. A wheel independent suspension system as claimed in claim 2, wherein said second section is connected to said first lateral link.

4. A wheel independent suspension system as claimed in claim 2, wherein said second section is connected to said second lateral link.

5. A wheel independent suspension system as claimed in claim 2, wherein said second section is connected to said third lateral link.

6. A wheel independent suspension system as claimed in claim 1, further comprising joining means through which said second section is connected with one of said lateral links, said joining means establishing, between said second section and said one of said lateral links, a rigid connection in a vertical direction with respect to the vehicle body and a soft connection in fore-and-aft and transverse directions with respect to the vehicle body, said one of said lateral links being more readily movable in the directions of the soft connection than in the direction of the rigid connection.

7. A wheel independent suspension system as claimed in claim 6, wherein said joining means includes an elastomeric bushing disposed between said second section and said one of said lateral links.

8. A wheel independent suspension system as claimed in claim 7, wherein said second section has a generally cylindrical rear-most end, wherein said elastomeric bushing is formed generally annular and securely fitted between said cylindrical rear-most end and one of said lateral links, said annular elastomeric bushing having flat opposite surfaces which are generally parallel with each other and perpendicular to the axis of one of said lateral links, and being formed with a pair of through-holes connecting said flat opposite surfaces and extending axially, said through-holes being located opposite to each other with respect to a vertical plane passing through the axis of one of said lateral links.

9. A wheel independent suspension system as claimed in claim 6, wherein said joining means includes a rigid connecting rod for connecting a rear-most end of said extended section and one of said lateral links.

10. A wheel independent suspension system as claimed in claim 9, wherein said joining means includes a first ball joint connecting a first end of said connecting rod and said rear-most end of said extended section, and a second ball joint connecting a second end of said connecting rod and one of said lateral link.

11. A wheel independent suspension system as claimed in claim 1, wherein said second section has an axis aligned with an axis of said longitudinal link.

12. A wheel independent suspension system as claimed in claim 1, wherein said wheel carrier is for a rear wheel.

13. A wheel independent suspension system as claimed in claim 1, wherein said longitudinal link is generally parallel with a horizontal plane passing through a rotational axis of a wheel carried by said wheel carrier, under a stationary state of the suspension system.

14. A wheel independent suspension system as claimed in claim 1, wherein said longitudinal link inclines relative to a horizontal plane passing through a rotational axis of a wheel carried by said wheel carrier, under a stationary state of the suspension system, to provide such an inclination that the first end of said longitudinal link is above the intermediate point of said longitudinal link with respect to the vehicle body.

15. A wheel independent suspension system as claimed in claim 1, wherein said second end is separated from said intermediate point of said longitudinal link by a distance more than ⅓ of a dimension of said wheel carrier in the vehicle body longitudinal direction.

16. A wheel independent suspension system as claimed in claim 1, wherein said second end is separated from said intermediate point of said longitudinal link by a distance more than ½ of a dimension of said wheel carrier in the vehicle body longitudinal direction.

17. A wheel independent suspension system for a vehicle, comprising:

a wheel carrier for rotatably supporting a wheel;

first, second and third lateral links through which said wheel carrier is movably connected with a vehicle body, said lateral links extending generally transversely with respect to a longitudinal direction of the vehicle body;

a longitudinal link through which said wheel carrier is movably connected to the vehicle body, said longitudinal link extending generally along the longitudinal direction of the vehicle body, said longitudinal link having a first section defined by a first end connected to the vehicle body and an intermediate point directly connected to a portion of said wheel carrier;

means for allowing the wheel carrier to make its vertical stroke movement with respect to the vehicle body, in cooperation with said lateral and longitudinal links; and a second section of the longitudinal link, defined by the intermediate point and a second end, the second section being integral with and extended from said longitudinal link intermediate point in a direction away from said first end of said longitudinal link, the second section being connected to said third lateral link;

wherein said first lateral link is located above said second and third lateral links with respect to the vehicle body and wherein said second link is located forward of said third lateral link with respect to the vehicle body.

* * * * *